Figure 1:
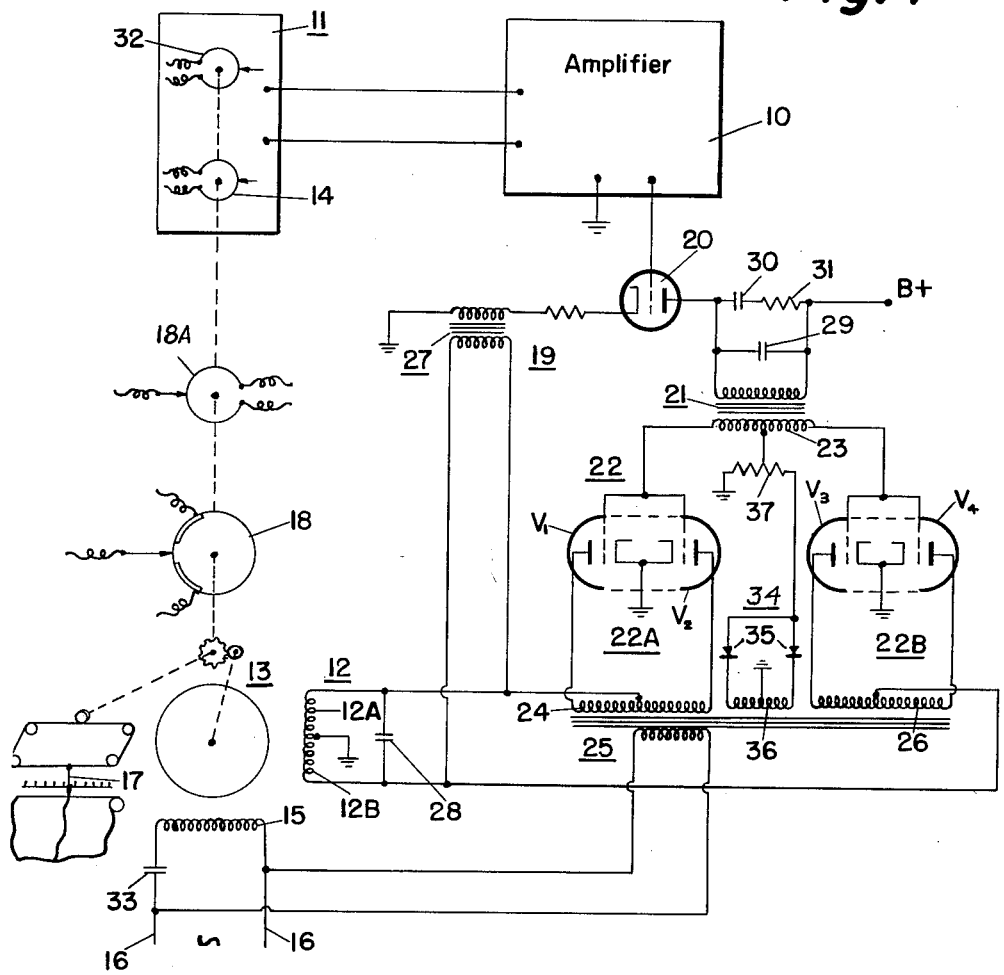

July 17, 1962  W. McADAM ETAL  3,045,155
SERVOSYSTEM WITH PUSH-PULL FED SERVOMOTOR
AND D.-C. COMPONENT SUPPRESSION
Filed Sept. 9, 1957  2 Sheets-Sheet 1

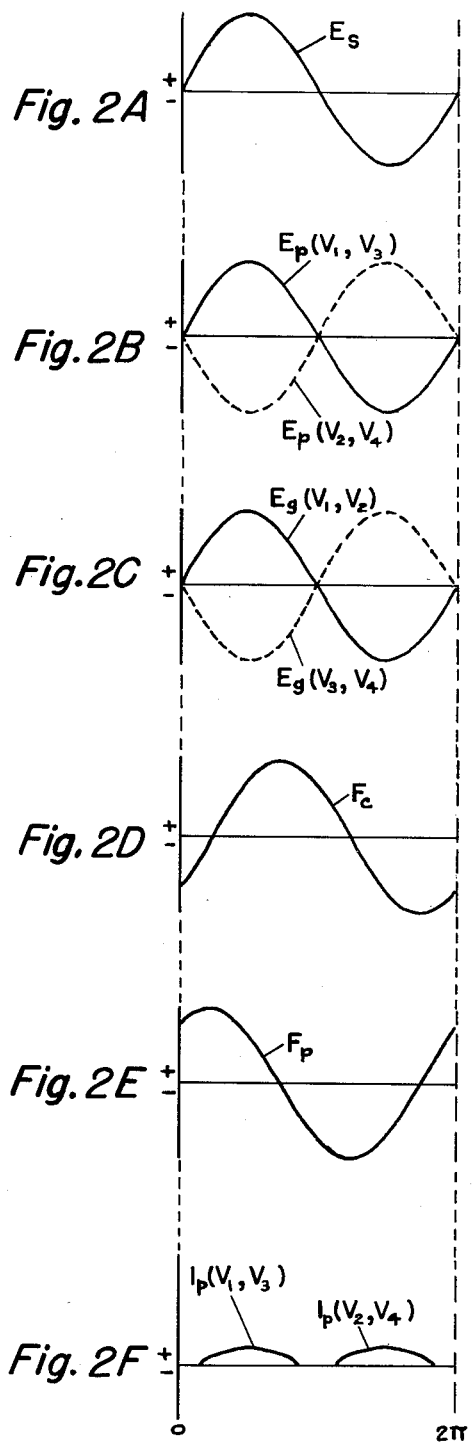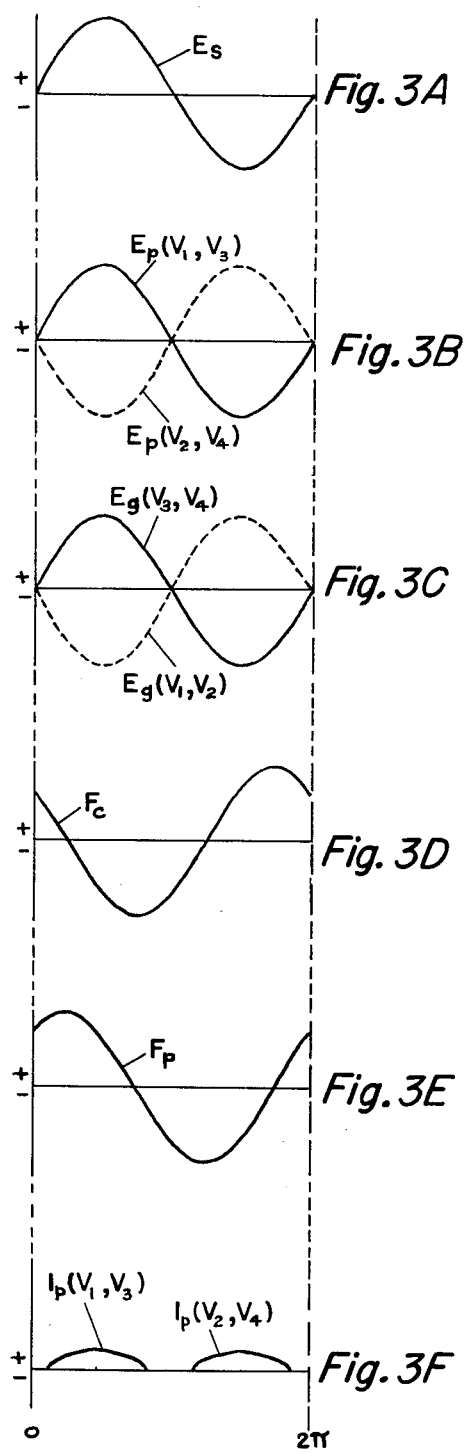

United States Patent Office 3,045,155
Patented July 17, 1962

3,045,155
SERVOSYSTEM WITH PUSH-PULL FED SERVO-MOTOR AND D.-C. COMPONENT SUPPRESSION
Will McAdam, Blue Bell, and John H. Moore, Havertown, Pa., assignors to Leeds and Northrup Company, Philadelphia, Pa., a corporation of Pennsylvania
Filed Sept. 9, 1957, Ser. No. 682,971
8 Claims. (Cl. 318—28)

This invention relates to self-balancing recorder and controller systems in which an amplified error signal is utilized to effect operation of a reversible motor which rebalances a network in the input system of the amplifier.

In such rebalancing systems, it is customary to use a two-phase motor having a power winding energized from an alternating current source and a control winding energized by the output current of the amplifier. Such current as applied to the control winding includes an A.C. component whose phase depends upon the sense of the error and a D.C. component which heretofore has been utilized to provide a braking or damping torque minimizing overshooting of the balance point. However, such damping torque is effective whenever the motor armature tends to rotate and so limits the useful output torque of the motor with consequent limitation of the speed of rebalancing upon application of an error signal. Such D.C. component can be eliminated from the control winding by interposition of a small isolating transformer between it and the amplifier but the poor efficiency of the transformer materially reduces the A.C. power supplied to the motor and so reduces its mechanical power output.

In accordance with the present invention, the speed of rebalancing of a recorder or controller can be substantially increased by increase in the useful power output without increase in power input by utilizing the amplified error signal to control two full-wave rectifying networks powered from the same source as the power winding of the motor. During existence of an error signal, the rectifier networks serving as the output stage of the amplifier alternately supply two different sections of the control winding with unidirectional current impulses. These impulses so alternately supplied to the control winding sections jointly produce an alternating magnetic flux which leads or lags the alternating flux produced by the power winding depending upon the sense of the error signal. Any D.C. currents from the rectifier networks to the respective control winding sections are effectively in opposition so that any net damping torque is negligible. Thus, upon application of an error signal from even a low power amplifier, the rebalancing motor is rapidly accelerated without reduction of output torque by D.C. damping in the motor or by an inefficient isolating transformer.

Further in accordance with the invention, the A.C. voltage developed across the control windings is fed back in degenerative sense to the driver stage for the dual full-wave rectifier output stage to minimize the effect of variations in power line voltage by stabilizing the gain of the output stage.

The invention further resides in features of combination and arrangement hereinafter described and claimed.

Figure 4:
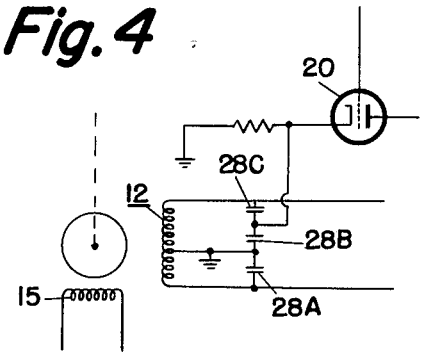

For a more complete understanding of the invention, reference is made in the following description of a preferred embodiment thereof to the attached drawings, in which:

FIG. 1 schematically illustrates a recorder-controller system embodying the invention;

FIGS. 2A–2F and FIGS. 3A–3F are explanatory figures referred to in discussion of the operation of FIG. 1; and FIG. 4 schematically illustrates a modification of the feedback arrangement shown in FIG. 1.

Referring to FIG. 1, the input circuit of the amplifier 10 includes a normally balanced network 11 which, when unbalanced, produces an error signal corresponding in sense and magnitude to the unbalance. The amplified error signal is utilized, as more fully hereinafter described, to energize the control winding 12 of a two-phase induction motor 13 to effect rebalancing adjustment of an element, exemplified by slidewire 14 of the rebalancing network. Upon restoration of balance, the error signal is reduced to zero and the motor comes to rest. The phase-reference winding 15 of motor 13 is energized from power line 16. The capacitor 33 is exemplary of the usual phase-shifting network or device for establishing between the magnetic fields of the motor windings 12 and 15 the phase relation required for rotation of the motor armature.

Concurrently with its rebalancing adjustment of slidewire 14 or equivalent, the motor 13 may also reposition the exhibiting element 17 of an indicator or recorder calibrated in units of temperature, pressure, or some other measured variable; it may also reposition one or more auxiliary devices such as the movable contact structure of a control switch 18, the movable element of a telemetering transmitter 18A, or a digitizing commutator for transmission of digital data from an analog recorder.

As will be understood by those skilled in the art, the type and composition of the balanceable input network 11 varies widely depending upon its specific purpose in a given installation. In general, network 11 may be of the bridge or potentiometer types, such as shown for example in Letters Patent Nos. 2,367,746, 2,547,105, 2,584,954 and 2,593,950, or it may be of the Seslyn type.

When network 11 is of the A.C. type, it is powered from the supply line 16 and its unbalanced output may be directly applied to the voltage amplifier 10 as the error signal; when network 11 is of the D.C. type, its unbalanced output is converted, as by a synchronous chopper or modulator, such as shown in certain of the aforesaid patents, into an alternating current having the same frequency as the supply source 16. In either event, the phase of the error voltage with respect to the phase of the voltage applied to winding 15 is reversible with change in sense of the unbalance of network 11.

In the particular arrangement shown in FIG. 1, the amplified error signal is applied to a driver stage 19, including a tube 20 which is coupled as by signal transformer 21 to the input circuits of two full-wave rectifying networks 22A, 22B which form the output stage 22 of the signal amplifying system.

Specifically, one terminal of the secondary winding 23 of transformer 21 is connected to the control electrodes of the two triodes V1, V2 of the full-wave rectifier network 22A and the opposite terminal of the secondary winding 23 is connected to the control electrodes of the second pair of triodes V3, V4 forming the other full-wave rectifying network 22B. The center tap of the secondary winding 23 is connected to the cathodes of all four triodes to form the grid return circuits. Thus the amplified error signal is applied in push-pull to the input circuits of the two full-wave rectifiers.

The network comprising capacitors 29, 30 and resistor 31 connected across the primary of the signal transformer 21 is for improving the waveform of the signal as applied to the dual full-wave rectifier system.

The output electrodes of triodes V1, V2 are connected to opposite terminals of the secondary winding 24 of a power transformer 25 supplied from supply line 16. The section 12A of the control winding 12 of rebalancing motor 13 is connected between the cathodes of triodes V1, V2 and the center tap of the secondary winding 24. Thus the control winding section 12A of motor 13 is included in the output circuit of the full-wave rectifier 22A.

The output electrodes of triodes V3, V4 are connected to opposite terminals of secondary winding 26 of power transformer 25 and the section 12B of control winding 12 is connected between the cathodes of triodes V3, V4 and the center tap of secondary 26. Thus the section 12B of the control winding 12 of motor 13 is included in the output circuit of the full-wave rectifier 22B.

As indicated in FIGS. 2A, 2B and 3A, 3B, the anode voltage of triode V1 of rectifier network 22A is in phase with the anode voltage of triode V3 of rectifier network 22B and both are in phase with the supply voltage $E_s$. During unbalance of network 11, an alternating signal voltage is applied in push-pull to the full-wave rectifying networks 22A, 22B. For either sense of unbalance the A.C. signal voltage applied to the grids of triodes V1, V2 of rectifier 22A is out of phase with the signal voltage applied to the grids of triodes V3, V4 of rectifier 22B. For one sense of unbalance the grid voltage $E_g$ of triodes V1, V2 is in phase with the supply voltage $E_s$ (FIGS. 2A, 2C) whereas for the opposite sense of unbalance the grid voltage $E_g$ of triodes V3, V4 is in phase with the supply voltage $E_s$ (FIGS. 3A, 3C).

For simplicity in the immediately following preliminary explanation of the operation of the output stage, it is for the present assumed that the triodes V1 to V4 are biased to cut-off so that the only anode current flow is due to an applied A.C. error signal.

There is first considered the energization of the control winding 12 when there exists the phase relations indicated in FIGS. 2A–2C. For the first half of each cycle of the supply voltage $E_s$ the grid and anode of triode V1 are both positive with respect to the cathode so that a unidirectional current impulse flows in section 12A of the control winding 12. For these alternating half cycles, the anode of triode V2 is negative with respect to its cathode and therefore the control winding 12A receives no current from triode V2. Also for these half cycles, the grids of triodes V3, V4 are negative so that control winding section 12B receives no current from the full-wave rectifier network 22B. For the second half of each cycle of the supply voltage $E_s$, the grids of triodes V1, V2 are negative and control winding section 12A receives no current from the full-wave rectifier network 22A. For these alternating half cycles, the grid and anode of triode V4 are simultaneously positive so that a unidirectional current impulse flows in section 12B of the control winding 12. For these alternating half cycles, the anode of triode V3 is negative and consequently, control winding section 12B receives no current from triode V3.

Thus for the in-phase relation of the error and supply voltages (FIGS. 2A–2C), the triode V1 of the full-wave rectifier system 22A and the triode V4 of the full-wave rectifier system 22B alternately respectively supply the two sections 12A, 12B of the control winding with unidirectional current impulses which jointly produce an alternating magnetic flux of the same frequency as that provided by excitation of the power winding 15 of the motor 13 from the supply line 16.

As indicated in FIGS. 2D, 2E, the alternating field $F_c$ produced by the control winding 12 of the motor lags the alternating field $F_p$ produced by the power winding 15 and accordingly, for the in-phase relations of FIGS. 2A–2C, the motor 13 rotates in a corresponding direction to effect a rebalancing adjustment of the slidewire 14 or equivalent.

There is now considered the out-of-phase relation of the error and supply voltages (FIGS. 3A–3C) corresponding with the opposite sense of unbalance of network 11. For the first half of each cycle of the supply voltage $E_s$ the grid and anode of triode V3 are simultaneously positive with respect to its cathode so that for such alternate half cycles a unidirectional current impulse flows in section 12B of control winding 12. For those alternate half cycles, the anode of triode V4 is negative and therefore control winding section 12B receives no current from triode V4. Also for these alternate half cycles, the grids of triodes V1 and V2 are negative so that the control winding section 12A receives no current from the full-wave rectifier 22A. For the second half of each cycle of the supply voltage $E_s$, the grids of triodes V3, V4 are negative and control winding section 12B receives no current from the full-wave rectifier system 22B. For these alternate half cycles, however, the grid and anode of triode V2 are simultaneously positive so that a unidirectional current impulse flows through section 12A of control winding 12; that section receives no current from triode V1 since its anode is, during these alternate half cycles, negative with respect to its cathode.

Thus for the out-of-phase relation of the error and supply voltages (FIGS. 3A–3C), the triode V3 of the full-wave rectifier 22B and triode V2 of the full-wave rectifier 22A alternately respectively supply the two sections 12B, 12A of the control winding 12 with unidirectional current impulses which jointly produce an alternating flux of the same frequency as that produced by power winding 15 of the motor 13. For this out-of-phase relation of the error and supply voltages, the alternating field $F_c$ (FIG. 3D) of the control winding 12 leads the alternating field $F_p$ (FIG. 3E) produced by winding 15 of the motor and accordingly the motor 13 rotates in direction reverse to that resulting from the phase relations of FIGS. 2A–2E.

During application of an error signal, there is not produced any net unidirectional magnetic flux which would exert a braking or damping torque upon the motor armature because of the opposite flow of D.C. current in the two sections of the motor control winding. Under the assumed cut-off bias conditions, none of the triodes of the full-wave rectifiers 22A, 22B passes current to the control winding 12 under conditions of zero-error signal.

It is now shown that when the D.C. bias applied to the control electrodes of triodes V1–V4 is insufficient to preclude flow of anode current during the anode voltage cycle, there is, nevertheless, not produced by the control winding any significant direct-current field productive of a torque. For the first half of each cycle of the supply voltage $E_s$ (FIGS. 2A, 3A), the anode voltage of triode V1 of the full-wave rectifier 22A and the anode voltage of triode V3 of the full-wave rectifier 22B are both positive and since the grid bias is less than cut-off, each of these triodes passes current for part of this half cycle (FIGS. 2F, 3F). However, these current impulses concurrently respectively energize both section 12A and 12B of the control winding. The resulting unidirectional magnetic fields of the control winding sections are in opposition and the net torque produced by them is substantially zero. For the second half of each cycle of the supply voltage $E_s$ (FIGS. 2A, 3A), the anode voltage of triode V2 of the full-wave rectifier 22A and the anode voltage of triode V4 of the full-wave rectifier 22B are both positive (FIGS. 2B, 3B), and since their grid bias is less than cut-off, each of these triodes respectively passes current to the sections 12A, 12B of control winding 12. Again, however, the resulting unidirectional magnetic fields of the control winding sections are in opposition and the net torque produced is substantially zero. Thus, under condition of zero error signal, there is no power-frequency vibration of the motor armature to introduce a jitter or instability into any of the elements positioned by the motor and there is no braking force resisting immediate and rapid acceleration of the motor when an error signal is applied to the output stage 22.

In the particular arrangement shown in FIG. 1, the D.C. negative bias for the grids of the triodes V1–V4 is provided by a full-wave rectifier network 34 comprising a pair of diodes 35, 35 powered from the secondary winding 36 of power transformer 25. The loading resistor 37 of the rectifier network is of suitably low resistance to minimize the effect of any grid current upon the grid bias.

To minimize the effect of line voltage variations and to stabilize the output stage, a fraction of the alternating voltage developed across the control winding 12 is fed back, in degenerative sense, to the driver stage 19. In the feedback arrangement shown in FIG. 1, the primary of a step-down transformer 27 is connected across the control winding 12 and the secondary of the feedback transformer is included in the grid cathode circuit of the driver tube 20. The capacitor 28 connected across the control winding 12 is for tuning it for maximum power transfer. In the alternative feedback arrangement shown in FIG. 4, such tuning capacitance is provided by capacitors 28A—28C connected in series across the control winding 12 also to provide a capacitive voltage-divider in part included in the cathode circuit of the driver tube 20. The feedback arrangement of FIG. 1 is independent of the degree of coupling between the motor winding sections.

As exemplary of the results obtained by use of the invention, the time required to effect rebalance in correction of an error corresponding with the full range of a 10" strip chart recorder was less than 0.4 second and the rebalancing motor accelerated to full speed in about 0.05 second. Such high speed balancing operation was attained with an amplifying system having maximum output of about only 15 watts. The triodes V1–V4 were respectively sections of 6BX7 type tubes operated class AB, the driver tube 20 was a section of a 12AU7 type tube; the pre-amplifier 10 had a voltage gain of 40 x 10$^6$ affording an overall voltage gain of about 125 x 10$^6$ which was adequate to effect movement of the motor shaft against the combined friction of the recorder and the auxiliaries with an error signal less than 2 microvolts. Such high gain exists only for a small range of input voltages since the amplifier saturates at input voltages which are only a very small fraction of a volt.

Overshooting of the rebalance point is avoided by providing, during the rebalancing operation, a signal whose magnitude depends upon the speed of the motor which is in opposition to the initial unbalance. Such damping signal may be provided, for example, by slidewire 32 driven from motor 13 and included in the rebalanceable network 11, generally as shown, for example, in FIG. 7 of the aforementioned Patent 2,367,746. In this or equivalent arrangements, the error signal as amplified and applied to the output stage 22, contains the damping information and whenever, during rebalancing, the damping voltage exceeds the remaining unbalance voltage, there is a reversal of phase of the composite error-damping signal and braking is then effected by reversal of the full-wave A.C. flux supplied by the control winding rather than by any D.C. flux which has continuously opposed rotation from the beginning of the rebalancing operation.

From the foregoing description of a preferred embodiment of the invention with explanation of its principles of operation, it will be understood by those skilled in the art that the invention is not limited to the particular arrangement disclosed but also comprehends equivalents within the scope of the appended claims.

What is claimed is:

1. A high-speed self-balancing system comprising means including a balanceable network for producing an alternating-current error signal of phase and magnitude corresponding with the sense and extent of unbalance of said network, said balanceable network including means adjustable to rebalance it, a two-phase motor for actuating said adjustable rebalancing means, said motor having a power winding for energization from a source of alternating current having the same frequency as said error signal and having a two-section control winding, two full-wave rectifier systems powered from said alternating-current source and respectively including the sections of said control winding in their output circuits, said rectifier systems each having a pair of negative output-electrodes and a pair of positive output-electrodes and with the electrodes of one of its said pairs directly connected to each other and to the corresponding pair of electrodes of the other rectifier system to be all of the same potential, and means for applying said error signal in push-pull to the input circuits of said full-wave rectifier systems for alternate supply thereby to the respective sections of said control winding of unidirectional current impulses which jointly produce an alternating flux of the same frequency as said source, whose phase is dependent upon the phase of the applied error signal and which has no substantial unidirectional component.

2. A self-rebalancing system as in claim 1 including means for minimizing the effect of variations in voltage of said alternating-current supply source for said full-wave rectifier systems and said power winding of said motor, said means including means for feeding a fraction of the alternating error-signal voltage produced across said control winding back into the input circuits of said full-wave rectifier systems in phase opposition to the applied error signal.

3. A high-speed self-rebalancing system comprising means including a balanceable network for producing an alternating-current error signal of phase and magnitude corresponding with the sense and extent of unbalance of said network, said balanceable network including means adjustable to rebalance it, a two-phase motor for actuating said adjustable rebalancing means, said motor having a power winding for energization from a source of alternating current having the same frequency as said error signal and having a two section control winding, two full-wave rectifier systems powered from said alternating-current source and respectviely including the sections of said control winding in their output circuits, a driver stage for applying said error signal in push-pull to the input circuits of said full-wave rectifier systems for alternate supply thereby to the respecitve sections of said control winding of unidirectional current impulses which jointly produce an alternating flux whose phase is dependent upon the phase of the applied error signal and which has no substantial unidirectional component, and a capacitive voltage-divider connected across said control winding and in part included in the input circuit of said driver stage to provide a degenerative feedback.

4. A system comprising a two-phase motor having a power winding for energization from a source of alternating current and a two-section control winding, two full-wave rectifier systems powered from said alternating-current source and respectively including the sections of said control winding in their output circuits, said rectifier systems each having a pair of negative output-electrodes and a pair of positive output-electrodes and with the electrodes of one of its said pairs directly connected to each other and to the corresponding pair of electrodes of the other rectifier system to be all of the same potential, and means for applying to the input circuits of said full-wave rectifier systems an alternating signal of the same frequency as said source and in or out of phase therewith, said full-wave rectifier systems alternately supplying to the respective sections of said control winding unidirectional current impulses which jointly produce an alternating flux of the same frequency as said source, of phase dependent upon the phase of the applied signal and having no substantial unidirectional component.

5. A system comprising an amplifier including a driver stage, two full-wave rectifier systems each including a pair of triodes, the cathodes of both pairs of triodes being connected to provide a common cathode connection, a transformer having its primary winding included in the output circuit of said driver stage and having the opposite terminals of its secondary winding connected respectively to the control electrodes of one of said pairs of triodes and to the control electrodes of the other of said pairs of triodes, power transformer means energized from a source of alternating current and having center-tapped secondary windings, the terminals of one of which are respectively connected to the output electrodes of one said pairs of triodes and the terminals of the other of which are respectively connected to the output electrodes of the other of said pairs of triodes, a two-phase motor having a power winding for energization from said source of alternating current and a two-section control winding, one section of which is connected between said common cathode connection of both full-wave rectifier systems and the center-tap of one of said secondary windings and the other section of which is connected between said common cathode connection of both full-wave rectifier systems and the center-tap of the other of said secondary windings, and means for supplying to said driver stage a signal having the same frequency as said source and which is in-phase or out-of-phase therewith, said rectifier systems alternating supplying to the respective sections of said control winding unidirectional current impulses which jointly produce an alternating flux of phase dependent upon the phase of the applied signal and having no substantial unidirectional component.

6. A high-speed self-balancing system comprising means including a balanceable network for producing an alternating-current error signal of phase and magnitude corresponding with the sense and extent of unbalance of said network, said balanceable network including means adjustable to rebalance it, a two-phase motor for actuating said adjustable rebalancing means, said motor having a power winding for energization from a source of alternating current having the same frequency as said error signal and having a two section control winding, two full-wave rectifiers powered from said alternating-current source with all cathodes of both full-wave rectifiers directly connected to provide a common cathode connection and having output circuits respectively including the two sections of said control winding of the motor, each of said full-wave rectifiers having control electrodes, and means for applying the error signal to said full-wave rectifiers having a first terminal of one instantaneous polarity connected to the control electrodes of one of said full-wave rectifiers, a second terminal of opposite instantaneous polarity connected to the control electrodes of the other of said full-wave rectifiers and an intermediate terminal connected to said common cathode connection through a common bias circuit for the control electrodes of both full-wave rectifiers to effect alternate supply by the two full-wave rectifiers to the respective control-winding sections of unidirectional current impulses which are of opposite polarity for successive half-waves of the error signal and which jointly produce an alternating flux of the same frequency as said energizing source for the power winding, whose phase is dependent upon the phase of the applied error signal, and which has no substantial unidirectional component.

7. A system comprising a two-phase motor having a power winding for energization from a source of alternating current and a two-section control winding, two full-wave rectifiers powered from said source with all cathodes of both rectifiers directly connected to provide a common cathode connection and respectively including the sections of said control winding in their output circuit, each of said full-wave rectifiers having control electrodes, a bias circuit, and means for producing an alternating signal of the same frequency as said source and in or out of phase therewith, said means having one output terminal connected to the control electrodes of one of said full-wave rectifiers, a second output terminal of opposite instantaneous polarity connected to the control electrodes of the other of said full-wave rectifiers and an intermediate terminal connected to said common cathode connection through said bias circuit, said two full-wave rectifiers for either phasing of the signal alternately supplying to the respective sections of said control winding of unidirectional current impulses which are of opposite polarity for successive half-waves of the signal and which jointly produce an alternating flux of the same frequency as said energizing source of the power winding, whose phase is dependent upon the phase of said signal, and which has no substantial unidirectional component.

8. A high-speed self-rebalancing system comprising means including a balanceable network for producing an alternating-current error signal of phase and magnitude corresponding with the sense and extent of unbalance of said network, said balanceable network including means adjustable to rebalance it, a two-phase motor for actuating said adjustable rebalancing means, said motor having a power winding for energization from a source of alternating current having the same frequency as said error signal and having a two-section control winding, two full-wave rectifier systems powered from said alternating-current source and respectively including the sections of said control winding in their output circuits, said rectifier systems each having a pair of negative output-electrodes and a pair of positive output-electrodes and with the electrodes of one of its said pairs directly connected to each other, to the corresponding pair of output electrodes of the other rectifier system and to each section of said control winding, a driver stage for applying said error signal in push-pull to the input circuits of said full-wave rectifier systems for alternate supply thereby to the respective sections of said control winding of unidirectional current impulses which jointly produce an alternating flux whose phase is dependent upon the phase of the applied error signal and which has no substantial unidirectional component, and a step-down transformer having its primary winding connected across said control winding and having its secondary winding in the input circuit of said driver stage to provide a degenerative feedback.

References Cited in the file of this patent
UNITED STATES PATENTS

| | | |
|---|---|---|
| 2,471,422 | Frost | May 31, 1949 |
| 2,527,718 | Grass | Oct. 31, 1950 |
| 2,621,318 | Few et al. | Dec. 9, 1952 |
| 2,681,430 | Mouzon | June 15, 1954 |
| 2,769,122 | Moreines et al. | Oct. 30, 1956 |
| 2,777,105 | Larsen | Jan. 8, 1959 |

UNITED STATES PATENT OFFICE
CERTIFICATE OF CORRECTION

Patent No. 3,045,155                      July 17, 1962

Will McAdam et al.

It is hereby certified that error appears in the above numbered patent requiring correction and that the said Letters Patent should read as corrected below.

Column 2, line 31, for "Seslyn" read -- Selsyn --; column 4, line 13, for "laternate" read -- alternate --; line 49, for "section" read -- sections --; column 6, line 35, for "respectviely" read -- respectively --; column 7, line 5, after "one" insert -- of --; column 8, line 61, under the heading "UNITED STATES PATENTS" for "Jan. 8, 1959" read -- Jan. 8, 1957 --; same list, after line 57, insert 2,610,312      Seay ------- Sept. 9, 1952 and after line 61, insert 2,810,874      Faymoreau ----- Oct. 22, 1957

Signed and sealed this 26th day of March 1963.

(SEAL)
Attest:

ESTON G. JOHNSON

Attesting Officer

DAVID L. LADD
Commissioner of Patents